Aug. 22, 1967     G. J. BARRY ET AL     3,336,892

CABLE DISPENSING AND LOCKING MEANS

Filed Jan. 19, 1966     3 Sheets-Sheet 1

INVENTORS.
GERALD J. BARRY and
THOMAS B. HARKER

BY Lockwood, Woodard, Smith & Weikart
Attorneys

INVENTORS.
GERALD J. BARRY and
THOMAS B. HARKER

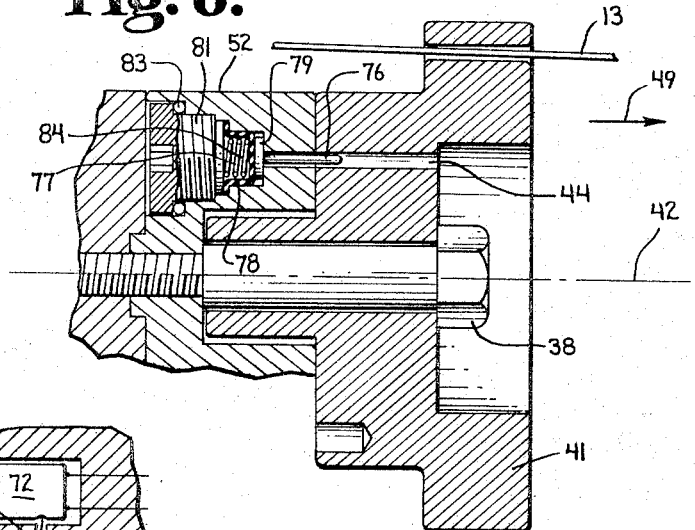
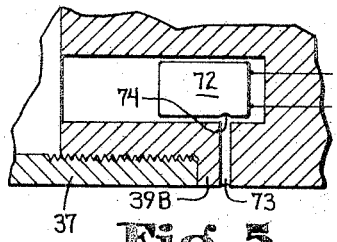
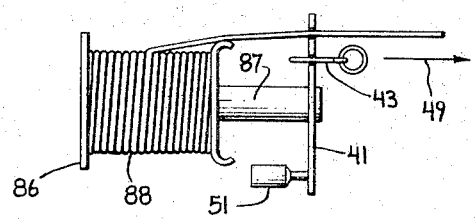
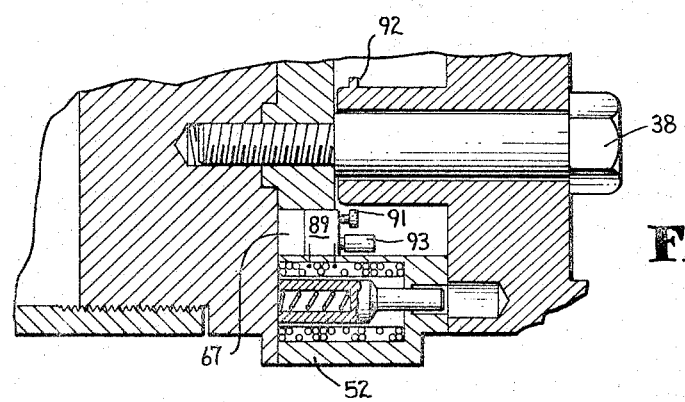

United States Patent Office 3,336,892
Patented Aug. 22, 1967

3,336,892
CABLE DISPENSING AND LOCKING MEANS
Gerald J. Barry and Thomas B. Harker, Fort Wayne, Ind., assignors to The Magnavox Company, Fort Wayne, Ind., a corporation of Delaware
Filed Jan. 19, 1966, Ser. No. 521,654
19 Claims. (Cl. 114—206)

ABSTRACT OF THE DISCLOSURE

A fixed coil of cable is unwound relative to a fixed core through a rotatable element which causes each turn of the cable to pay out freely without binding. When the desired length of cable has been payed out, the rotatable element is stopped. Stopping of the rotatable element causes the cable to wind itself on the core as it pays out until the friction of the wound cable on the core stops further pay out.

This invention relates generally to cable handling equipment and more particularly to means for dispensing cable from a storage coil or spool, and means for stopping the payout of cable in response to a certain operating condition such as, for example, the payout of a certain desired length of cable.

In various devices, including underwater buoys, for example, anchor cable storage systems of the prior art use rotating cable storage spools or non-rotating cable storage packaging. In the rotating spool type storage, payout is limited by stopping spool rotation. Examples of this type storage and payout limiting are illustrated in Patent No. 3,035,285 to Squires, Patent No. 3,054,123 to Moeller, and Patent No. 2,722,018 to Mueller.

Non-rotating cable storage packaging affords several advantages which include high density packing, considerable freedom of package shape selection, and minimum resistance or drag on cable payout, for example. Heretofore, however, non-rotating storage has made it difficult to limit or stop cable payout. Because of this, applications of such storage have generally been limited to those where a predetermined amount of cable can be packaged and paid out without the requirement of limiting the payout. Such applications are illustrated in Patent No. 3,036,542 to Robinson, and Patent No. 2,993,461 to Feiler.

It is therefore a general object to provide cable controlling apparatus enabling a greater variety of applications of non-rotating cable storage.

A further object is to provide means adapted to an initial limitation on cable payout from storage, but operable when desired to enable cable payout from storage, and then operable in response to a certain desired operating condition, to again limit or terminate cable payout.

A further object is to provide means for limiting cable payout from storage and which are controllable by a variety of condition responsive sensors.

The term "cable" is used herein generically and is not limited to a braided or stranded construction nor is it limited to any particular material.

Described briefly, the invention involves a generally cylindrical core associated with a coil of cable. The core can be inwardly spaced from the coil or the coil can be wound on the core. In either event, the cable coil is not rotatable with respect to the core. As the cable is withdrawn from the cable coil, it is dispensed outwardly in a direction which is generally parallel to the axis of the core. Such withdrawal of the cable causes the cable to revolve about the outer periphery of the core as it unwinds from the cable coil.

So long as the unwound cable is allowed to revolve freely and unimpeded about the core in the aforementioned fashion, cable payout will continue; however, when this cable motion about the core is obstructed or restricted by any means, additional withdrawal of the cable from the cable coil will cause the cable to wind itself on and around the outer periphery of the core whereupon the friction created between the wound cable and core will terminate further unwinding and payout of the cable from the cable coil.

If and when so desired, subsequent removal of said restriction will allow said cable to first unwind from the core followed by an unwinding of the cable from the cable coil, thus allowing cable payout to continue.

A typical embodiment of the present invention uses as the restricting device a rotary member mounted for rotation with respect to the coil or core and may have a notch or aperture therein through which the free end of the cable extends. The rotary member is allowed to rotate, and rotation thereof is caused by the unwinding of the various turns of the coil and passage of the cable through the aperture or notch in the rotary member as the coil is unwound.

To terminate unwinding of the cable, means are provided to stop rotation of the rotary member, whereupon the brief additional unwinding of the turns of cable from the coil results in a rewinding of the said cable tightly onto the core as previously described; cable payout is thus terminated by the friction developed between the cable and the core.

The full nature of the invention will be understood from the accompanying drawings and the following description and the claims:

FIGURE 5 is a fragmentary view of the portion shown in FIGURE 4, but illustrating a pressure sensitive switch for operating the solenoid circuit, rather than the cord operated switch shown in FIGURE 4.

FIGURE 6 is a fragmentary view of FIGURE 3 but showing a pressure-operated spring-biased pin employed to hold the rotor locked initially, in contrast to the manually operable pull pin of FIGURE 3.

FIGURE 7 is a diagrammatic view of an embodiment of the present invention in combination with a cable coil which is initially stored on a stationary spool.

FIGURE 8 is a fragmentary view like FIGURE 5 but illustrating the use of a turns counter to control the solenoid rather than a pressure sensitive switch.

Figure 1:
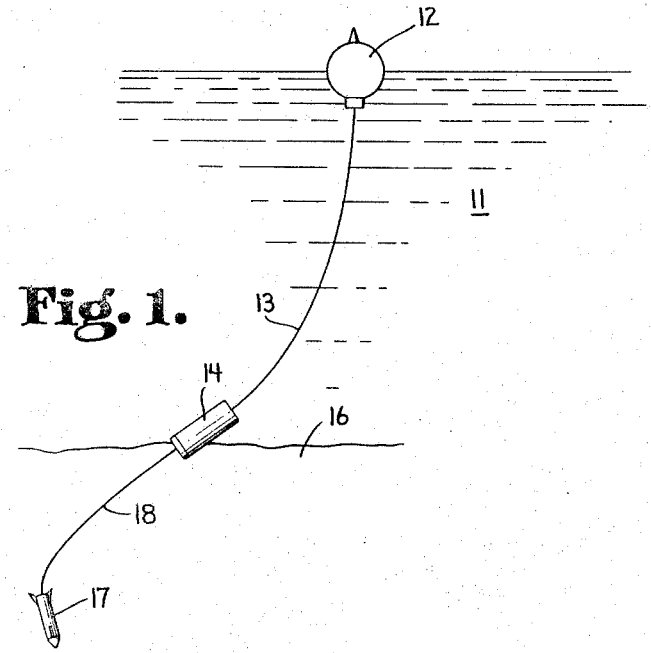
FIGURE 1 is a schematic diagram of an anchor and buoy system of a type in which the present invention is quite useful, the system being shown deployed in a body of water.

Referring now to the drawings in detail, FIGURE 1 shows a body of water 11 wherein a float 12 has a cable 13 suspended therefrom and entering the upper end of a canister 14 located at the ocean bottom 16. An anchor 17 is embedded in the ocean bottom material and an anchor cable 18 connects the canister to the anchor.

Figure 2A:
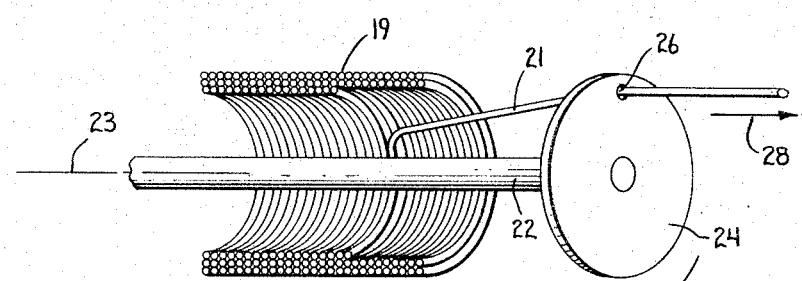
FIGURE 2A is a schematic diagram illustrating the basic concept of the present invention as applied to a cable pack which is not mounted on a central internal core.

Referring now to FIGURE 2A, one-half of a cylindrical coil of many turns of cable in a pack, is shown. Such a hollow cylindrical coil 19 can be formed by applying a suitable adhesive material between each layer of winding turns. As an alternative, the cable could be "wet" wound with an adhesive material, if so desired. A pretwist of the cable 21 along its axis is added during winding of the coil. The adhesive causes sufficient resistance to unwinding, to overcome the self-unwinding forces within the cable coil itself. The pretwist cancels out the twisting which occurs during withdrawal of the cable from the coil, thus allowing the payed out cable to be torque-free. Further with reference to FIGURE 2A, a stationary central core 22 is provided and its longitudinal axis 23 is colinear with the axis of the stationary coil 19. According to one embodiment of the present invention a disk 24 is provided at one end of the core 22, and is mounted thereon for rotation, so that as the cable 21 is pulled through the aperture 26 thereof, causing unwinding of the cable from the coil and rotation of the unwound cable around the core at the plane of the disk, the revolving cable causes the disk to rotate in the direction of the arrow 27. This occurs when cable 21 is pulled in the direction of the arrow 28.

Figure 2B:
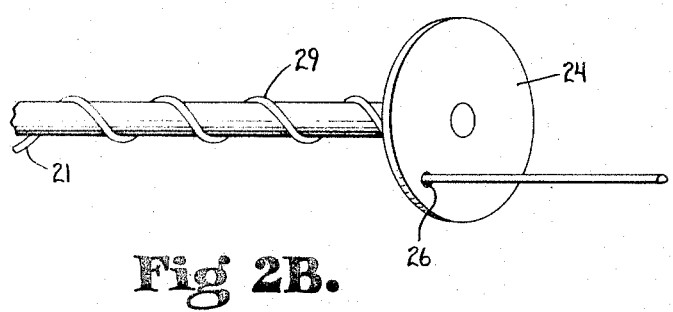
FIGURE 2B illustrates the effect of stopping rotation of the disk in the apparatus of FIGURE 2A, as cable is pulled from the coil, the coil being omitted in this particular figure.

Referring now to FIGURE 2B, which is like FIGURE 2A except for the omission of the coil, the effect of stopping the disk rotation, according to another feature of this invention, is illustrated. The effect is to cause the cable which continues to be pulled through the aperture 26 to wrap the cable unwinding from the coil around the core as shown at 29. Continued withdrawal of the cable winds the cable about the core until such time that sufficient friction exists between the core and cable to prevent any further withdrawal of the cable. Although the illustrated core is of relatively small diameter, a large diameter core might be advantageous in providing greater contact area between the core and cable and increase cable holding friction.

Figure 3:
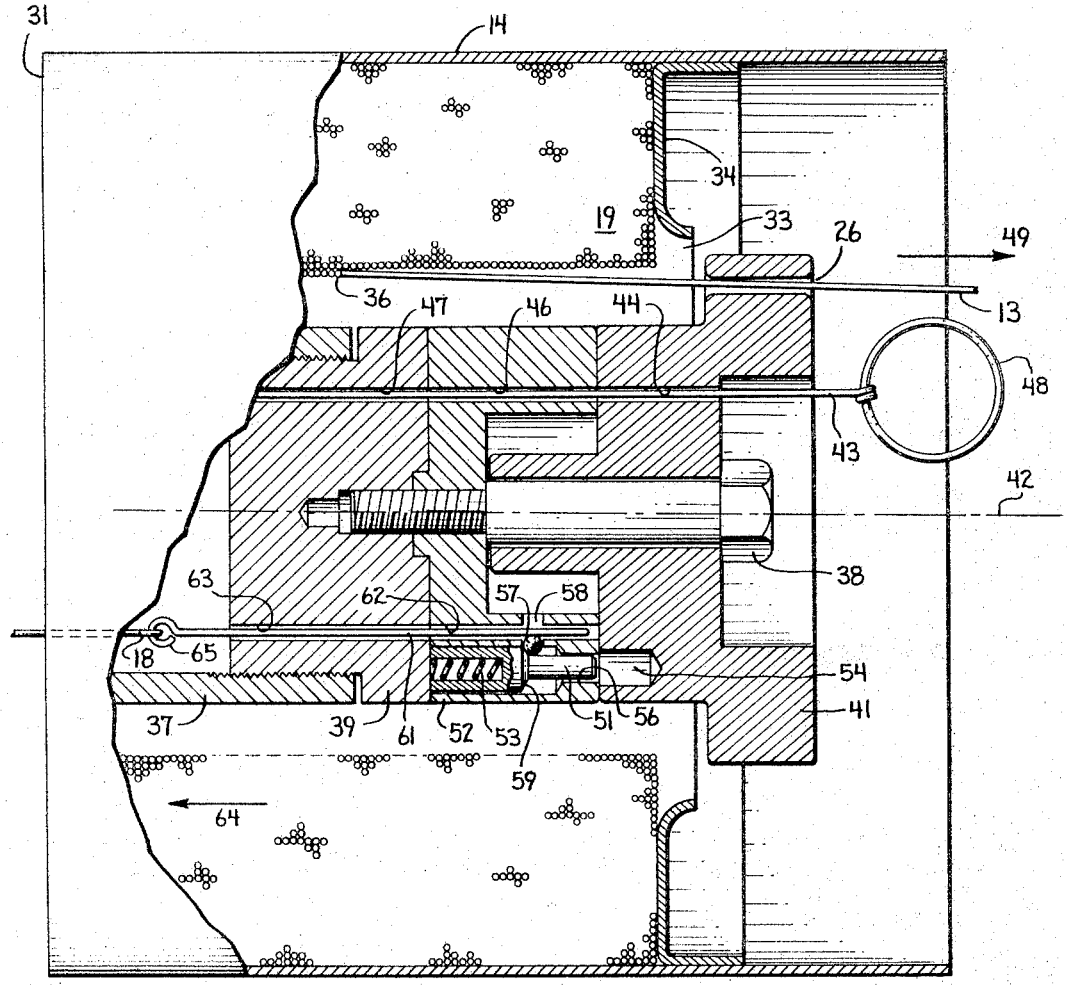
FIGURE 3 is an enlarged fragmentary cross-section through the cable package of FIGURE 1 and illustrating an embodiment of the present invention incorporated therein.

Referring now to FIGURE 3, the coil 19 is shown packed in the canister 14 in the manner described above with reference to FIGURE 2A. Although the coil might be considerably longer than represented in FIGURE 3, it will be assumed for purposes of explanation that the coil ends at the line 31 and that it is desired to withdraw cable from the canister through the central opening 33 in the plate 34. For consistency with FIGURE 1, the cable will be referred to by the reference numeral 13 and the cable turn being unwound is identified by the reference numeral 36. The stationary central core 37 is inwardly spaced from the coil to facilitate unwinding of the turns of cable from the coil. According to the present invention, a bearing post 38 is threadedly received in the end cap 39 of the core 37 and serves as a mount for the rotor 41 which is rotatable thereon about the axis 42.

To prevent initial rotation of the rotor, a locking wire 43 is received in the aligned passages 44, 46, and 47 in the rotor, the lock pin housing, and core end cap, respectively. This retainer wire has the pull ring 48 at the outer end thereof, which can be pulled manually, when desired to release the rotor. Prior to this time, any pull on the cable in the direction of the arrow 49 will cause several turns to unwind from the coil and wrap around the core and become tight thereon, preventing further payout of the cable in the direction of the arrow 49.

Once the retainer wire 43 is pulled out, the rotor is free to turn and if one end of the cable 13 is connected to the float 12, and the canister is allowed to drop into the water, the cable will be payed out of the upper end of the canister through the aperture 33, causing the rotor to rotate rapidly.

To stop further rotation of the rotor, in response to a certain operating condition, a lock pin 51 is provided in the lock pin housing 52 and is biased upwardly toward the aperture 33 by means of the coil spring 53. If this pin were allowed to move toward the aperture 33 in its bore, it could enter the lock pin receiver 54 in the lower or front end of the rotor. Of course it could only enter the receiver hole when the rotor has moved around in rotation to a position of registry of the receiver with the lock pin bore 56.

To normally prevent the lock pin from entering the receiver, a retainer ball 57 is disposed in a passageway 58 transverse to the axis 42 and transverse to the lock pin bore axis. This ball is trapped between the tapered camming conical surface 59 of the lock pin and the ball retainer wire 61 which is received in the aligned passageways 62 and 63 respectively of the lock pin housing and the core end cap respectively.

In deployment of apparatus such as shown in FIGURE 1, some devices such as those shown in the above mentioned Squires and Moeller patents fire the anchor such as 17 into the ocean bottom material. This event can be used to pull the wire 61 forwardly in the direction of the arrow 64, by passing the anchor cable 18, for example through a loop 65 in the front end of the wire. This disengages the retainer wire 61 from the ball 57 whereupon the conical surface on the lock pin cams the ball outwardly from the lock pin bore and inwardly toward axis 42 so that the ball is moved out of the path of the lock pin. The lock pin can then move into the receiver 54 the next time it moves into registry therewith. This will immediately lock the rotor whereupon any further tension on cable 13 in the direction of the arrow 49 will begin to wrap the cable onto the core. Further tension will tighten the cable on the core and prevent any further unwinding of the cable. Thus, a certain desired length of cable will have paid out and the distance from the anchor to the float or buoy 12 in FIGURE 1 will be limited, not by the amount of cable remaining in the pack but rather by the fact that the rotor has been locked.

So it is seen, that if some event such as impact of the canister with the bottom 16 is used by the anchor, and drives it into the ocean bottom, and this anchor activates the lock pin in the cable payout system, further payout of cable 13 will be terminated. In this way, regardless of the amount of cable in the pack, the device can be used in bodies of water of varying depths, with the same result being achieved, so long as the total amount of cable necessary for the depth encountered, does not exceed that in the cable pack initially.

Figure 4:
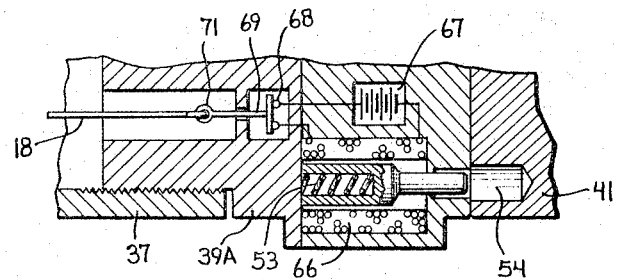
FIGURE 4 is a fragmentary view, in section, of a portion of the apparatus of FIGURE 3 which has been modified to employ solenoid means for operating the lock pin, rather than the ball and pin retainer means shown in FIGURE 3.

In FIGURE 4, where parts like those in FIGURE 3 are given the same reference numerals, the lock pin is normally kept inactivated by the magnetic field established by the solenoid winding 66 which holds the pin in the position shown. This winding is energized by the battery 67 and the solenoid circuit is completed through the switch 68. The switch contactor may have a stem 69, for example with a loop 71 therein at the end thereof, like that in the retainer wire 61 of FIGURE 3 and through which the cable 18 is passed. So long as the circuit remains energized by the switch remaining closed, the lock pin will remain inactivated in the position shown. As soon as the anchor cable 18 pulls the ring to break contact in the switch 68, spring 53 will drive the lock pin into the receiver 54 as soon as the receiver moves into registry therewith.

In FIGURE 5, instead of having a switch 68 operated by a pull ring 71, a pressure responsive switch 72 is provided and the environmental pressure is communicated thereto through the passageway 73 and aperture 74 in the switch itself. When the pressure rises to a predeterminded value, the switch will open permitting the lock pin to be activated. Otherwise this embodiment is the same as that in FIGURE 4. However, this embodiment provides one means of terminating cable payout when the device has encountered a predetermined pressure, such as would occur at a certain depth in water.

FIGURE 6 illustrates another embodiment, wherein the initial rotation of the rotor does not occur until a certain environmental pressure has been reached. For this purpose, the retainer pin 76 is hydrostatically operated. It has a spring 77 therein biasing it in the direction of the arrow 49. However, a rolling diaphragm 78 may be provided between the flange or piston 79 of the pin and the plug 81, which secures the diaphragm in position in the housing 52, there being a seal 83 between the plug and housing. So while the pressure in the chamber 84 under the diaphragm might be normal atmospheric pressure, as the device descends in water the pressure on the other side increases with hydrostatic pressure until the point where the bias of the spring is overcome and the wire is moved back out the passage 44. It thereupon releases the rotor which then enables payout of the cable 13.

In the embodiment of FIGURE 7, a stationary spool 86 is mounted on the stationary core 87 and the rotor can be exactly like the rotor of FIGURE 6 and so was given the reference numeral 41. The initial locking means in the form of wire 43 of FIGURE 3 or the wire 76 of FIGURE 6 can be employed and is shown schematically. The lock pin 51 of any of the previously described embodiments may also be used, and is shown schematically. In this embodiment, however, the cable coil 88 was initially wound on the spool and pays out therefrom in the direction of the arrow 49. If wire 43 remains installed as shown, a brief payout of cable will cause the cessation of unwinding, with immediate tightening of the cable onto the core, depending upon the amount of tension on the cable. If the disk is allowed to rotate, by pulling the pin 43, cable will pay out from the core until the lock pin 51 is engaged to stop the disk rotation whereupon the payout will stop immediately and cable will again be tightened onto the core at the point from which it was unwinding, immediately prior to stopping disk rotation.

In FIGURE 8, the solenoid controlling the lock pin is powered by the battery 67, as before, but the switch 35 therefor is controlled by a turns counter 89 having a sprocket or drive wheel 91 at the front end thereof engaged once every revolution of the rotor by a pin 92 on the rotor. A knob 93 is provided at the front of the turns counter and can be used to provide an adjustment so that the switch will be opened at a predetermined number of turns of the rotor, to de-energize the solenoid and stop further rotation of the rotor.

Several embodiments of this invention might be made without departing from the scope thereof; for example, other configurations of the restricting member may be used in lieu of the above described rotary disk. A revolving segment or arm can be used which when locked against rotation will cause the cable to wind upon the core and result in payout termination. The restricting member can also be a non-rotating arm or the like which when caused to protrude into the area immediately surrounding the core will result in cable payout termination in the manner described above. Therefore, while the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:
1. Cable dispensing and locking means comprising:
a core associated with a coil of cable;
a rotary member mounted for rotation with respect to said coil and having a portion sized to permit passage of cable therethrough and encourage rotation of said rotary member as the cable unwinds from the coil;
and means for reducing rotational speed of said rotary member independently of speed of unwinding of the cable, to thereby tighten the cable on the core and prevent further passage of cable through said sized portion.

2. The combination of claim 1 wherein said speed reducing means include:
a turns counter connected to said rotary member, said turns counter being able to be preset to a predetermined setting and operable by said rotary member upon attainment of said setting to stop rotation of said rotary member.

3. The combination of claim 1 wherein said speed reducing means include:
a lock pin;
a pin receiver in said rotary member and disposed to receive said lock pin at a certain rotational position of said rotary member;
and biasing means engaging and urging said pin toward said receiver;
said combination further comprising:
a first retainer member having a first position wherein said retainer member engages said pin and normally prevents said lock pin from moving into said receiver,
a second retainer member engaging said first retainer member and normally holding it in said first position,
said second retainer member being operable by means external to said cable dispensing and locking means to disengage said first retainer member, said first retainer member being thereupon movable out of said first position to release said lock pin to move into said receiver, said lock pin being mounted to thereupon stop further rotation of said rotary member.

4. The combination of claim 3 wherein:
said lock pin is mounted for linear motion in said core,
said first retainer is a ball disposed in a passageway extending transverse to the direction of motion of said lock pin, said ball normally engaging an inclined frontal surface of said pin,
said second retainer is a wire transverse to and extending through said passageway and holding said ball against said inclined frontal surface, said ball being cammed out in said passageway and away from the path of said lock pin by said lock pin when said wire is disengaged from said ball.

5. The combination of claim 1 wherein said speed reducing means include:
a lock pin;
a pin receiver in said rotary member and disposed to receive said lock pin at a certain rotational position of said rotary member;
and a solenoid coupled to said lock pin and operable, when actuated, to enable said lock pin to move into said receiver when said receiver moves into registry with said lock pin.

6. The combination of claim 5 and further comprising:
a condition responsive device coupled to said solenoid to actuate said solenoid by de-energization thereof in response to the attainment of a certain predetermined condition.

7. The combination of claim 6 wherein said condition responsive device is a pressure sensitive switch in circuit with a source of electrical energy and with a winding of said solenoid, and operable in response to increase of environmental pressure to a predetermined level to open said circuit and thereby de-energize said solenoid winding.

8. The combination of claim 6 wherein said condition responsive device includes a turns counter and a switch, said switch being in circuit with a source of electrical energy and with a winding of said solenoid and operable by said turns counter to open said circuit in response to the counting of a predetermined number of turns of said rotary member by said turns counter.

9. The combination of claim 6 wherein said condition responsive device includes a switch in circuit with a source of electrical energy and with a winding of said solenoid, said switch being operable by an anchor cable connected thereto upon activation of the anchor cable to open said circuit and thereby de-energize said solenoid.

10. The combination of claim 1 and further comprising:
initial locking means on said rotary member and normally operable to prevent initial rotation of said rotary member with respect to said coil and thereby limit initial unwinding of said cable.

11. The combination of claim 10 wherein said initial locking means includes a locking wire extending through a portion of said rotary member and a portion of said core and preventing initial rotation of said rotary member until removal of said wire from a condition of engagement with both said rotary member and said core.

12. The combination of claim 10 wherein said intial locking means includes a pin lockingly engaging said rotary member and said core, and pressure responsive means operable in response to increase of environmental pressure above a first predetermined pressure to terminate the condition of locking engagement of said rotary member and said core with said pin to permit rotation of said rotary member in response to increase of environmental pressure to said predetermined pressure and thereupon permit initial unwinding of cable from said coil.

13. The combination of claim 12 wherein said speed reducing means includes:
a lock pin;
a pin receiver in said rotary member and disposed to receive said lock pin at a certain rotation position of said rotary member;
biasing means engaging and urging said pin toward said receiver;
and actuator means normally preventing said lock pin from entering said receiver, but operable, when actuated, to enable said lock pin to enter said receiver;
and second pressure responsive means operable in response to a second predetermined pressure higher than said first predetermined pressure to actuate said actuator means and enable said lock pin to enter said receiver and terminate rotation of said rotary member, whereby cable payout from said coil is initiated in response to a first predetermined pressure and is terminated in response to a second predetermined pressure higher than said first predetermined pressure.

14. Cable storage, dispensing, and locking means, comprising:
a non-rotating pack of coiled cable;
a core associated with said pack;
a rotor having a portion disposed for passage of the cable therethrough during unwinding of the cable from the pack, said rotor being rotatable by said cable during unwinding of the cable from the pack and passage of the cable through said opening;
and means for changing speed of rotation of said rotor with respect to speed of unwinding of said cable, to tighten said cable on said core and prevent further unwinding of said cable.

15. The combination of claim 14 wherein the inner windings of said cable pack are spaced radially outward from said core.

16. The combination of claim 14 wherein the pack is mounted on said core.

17. Cable dispensing and locking means comprising:
a core associated with a coil of cable, said core and coil being non-rotatable with respect to each other and said cable being rotatable around said core as said cable is unwound from said core and pays out in a direction generally parallel to the axis of the coil,
and means for restricting the rotation of cable about said core as the cable is unwound from said coil and pays out in a direction generally parallel with the axis of said coil, to thereby wind and tighten the cable on the core and prevent further unwinding of the cable from the said cable coil.

18. The combination of claim 17 wherein the inner windings of said coil are spaced radially outward from said core.

19. The combination of claim 17 wherein the coil is mounted on said core.

References Cited
UNITED STATES PATENTS

| | | | |
|---|---|---|---|
| 2,911,165 | 11/1959 | Sarah | 242—84.2 |
| 3,035,285 | 5/1962 | Squires | 114—206 X |
| 3,054,123 | 9/1962 | Moeller | 114—206 X |
| 3,113,547 | 12/1963 | Stewart | 114—235 |
| 3,187,705 | 6/1965 | Costella et al. | 114—206 |

MILTON BUCHLER, *Primary Examiner.*

T. M. BLIX, *Assistant Examiner.*